Aug. 25, 1936.  J. W. LOGAN, JR., ET AL  2,052,201
COMBINED ELECTRIC AND PNEUMATIC BRAKE APPARATUS
Filed Dec. 1, 1933  2 Sheets-Sheet 2
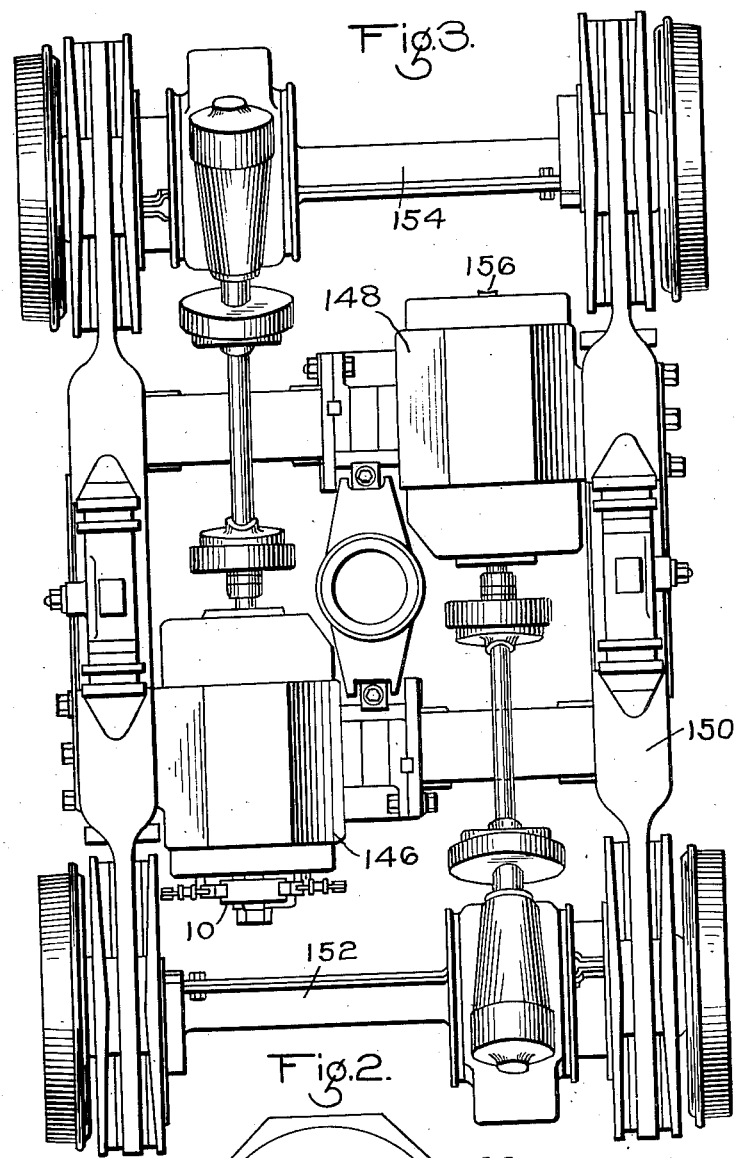
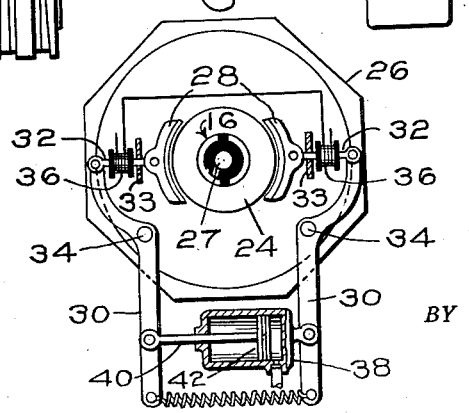
INVENTORS
JOHN W. LOGAN JR.
GEORGE W. BAUGHMAN
BY
Wm. M. Cady
ATTORNEY Patented Aug. 25, 1936

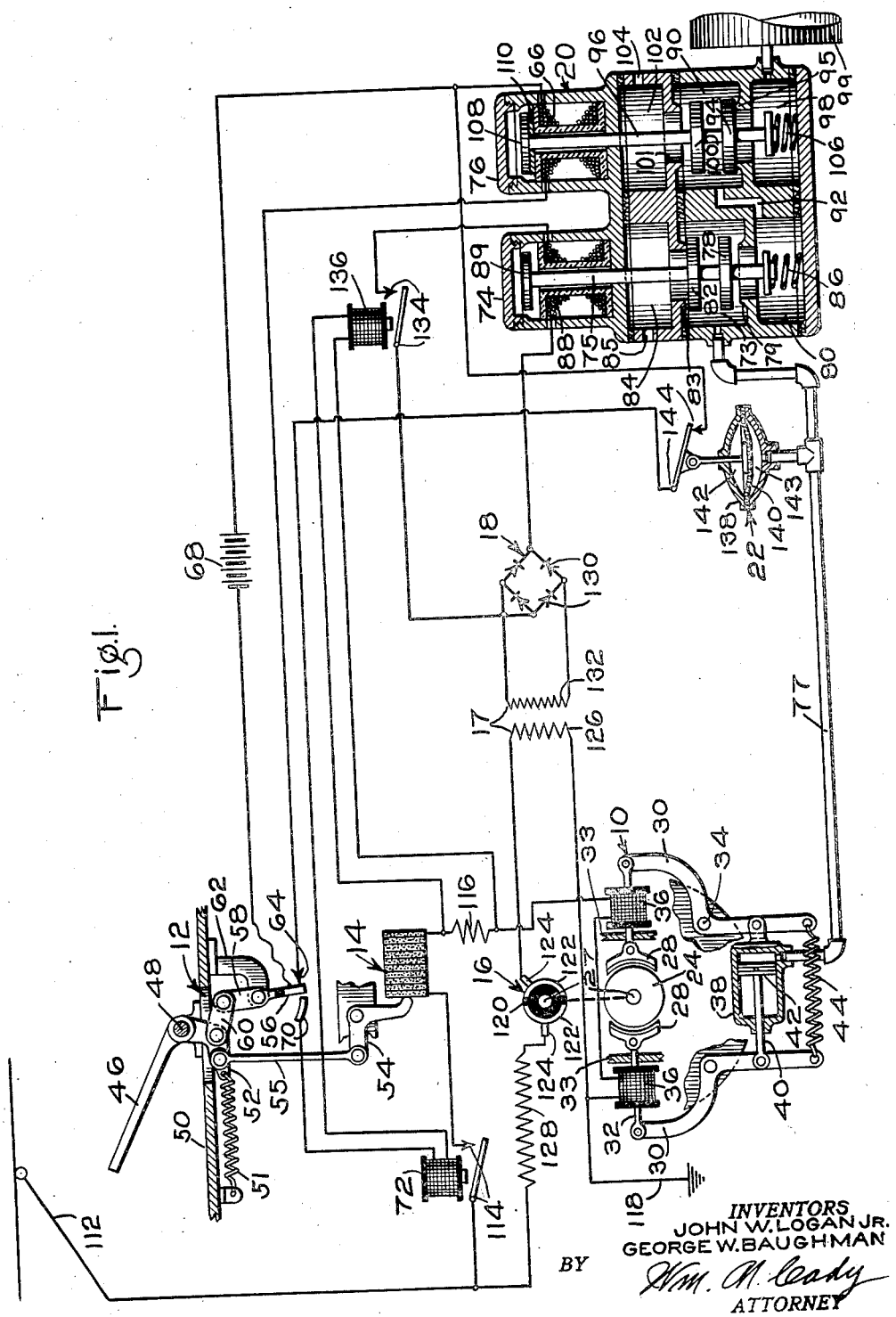

2,052,201

UNITED STATES PATENT OFFICE 2,052,201

COMBINED ELECTRIC AND PNEUMATIC BRAKE APPARATUS

John W. Logan, Jr., Wilkinsburg, and George W. Baughman, Edgewood, Pa., assignors to The Westinghouse Air Brake Company, Wilmerding, Pa., a corporation of Pennsylvania Application December 1, 1933, Serial No. 700,410

21 Claims. (Cl. 188—156)

This invention relates to a combined electric and pneumatic brake apparatus, and more particularly to such an apparatus adapted to produce a combined friction and electro-dynamic braking effect by electric means and a friction braking effect only by pneumatic or other fluid pressure means.

In a copending application of John W. Logan, Jr., for a Combined friction and electric brake, filed November 7, 1933 and bearing Serial Number 696,993, there was described and claimed a brake device in which brake shoes were associated with stator electromagnets, which when energized caused the shoes to be magnetically attracted to, and magnetic flux to be produced in, a rotor member, thereby producing both a friction and an eddy current braking effect on the rotor when rotating, and a friction braking effect thereon when at rest.

To produce this latter friction brake effect when the rotor, and hence the vehicle with which the brake device is associated, is at rest, requires that the stator electromagnets be continuously energized during that time. Since the vehicle may have relatively long stop periods the total of the electrical energy consumed by the brakes during these periods may constitute the greater part of the total energy consumed for all applications of the brakes. To effect a saving of the electrical energy used during the stop periods, we propose to provide an improved brake apparatus of the character referred to, in which the brake apparatus is actuated by electrical means when the vehicle is in motion and by fluid pressure means when the vehicle is at rest. Since it has been common practice heretofore, with respect to railway vehicles, to also include a fluid pressure brake equipment along with the electric brake equipment, for braking during emergency conditions or at low speeds, it will be obvious that for such vehicles a combined brake apparatus such as we propose will save electrical energy without adding equipment over and above that already commonly used, and without incurring an additional cost in operating the fluid pressure brake equipment.

It is, therefore, a general object of our invention to provide a brake apparatus which is operable by electric means to produce a combined friction and eddy current braking effect and which is also operable by fluid pressure means to produce a friction brake effect only.

Another object is to provide a brake apparatus of this character in which the braking action on a vehicle is produced by electric means while the vehicle is in motion, and by fluid pressure means while the vehicle is at rest.

A still further object is to provide a brake apparatus of this character in which the degree of braking in bringing a vehicle to a stop is controlled by the degree of movement of a single control element, and which will automatically change over from braking produced by electric means to braking produced by fluid pressure means when the vehicle comes to a stop, regardless of the degree of movement of the control element.

Other objects and advantages of our invention will be apparent from the following description, illustrated in the attached drawings and showing one embodiment thereof, in which, Fig. 1 is a schematic arrangement of the essential apparatus comprising this embodiment.

Fig. 2 illustrates somewhat diagrammatically the form of combined electric and pneumatic brake device used.

Fig. 3 shows an adaptation of the brake device illustrated in Fig. 2 to the trucks of a motor driven vehicle.

Referring now principally to Fig. 1 of the drawings, in the embodiment there shown we have provided a combined electric and pneumatic brake device 10, adapted to be controlled by a foot pedal device 12, in connection with a rheostat device 14, a current interrupter device 16, a rectifier device 18, a magnetically controlled valve device 20, a pneumatically operated circuit breaker 22, and other apparatus to be referred to subsequently.

The brake device 10 (see also Fig. 2) is provided with a rotor or brake drum 24, which may be rigidly secured to the shaft of a driving motor 26, or to any other shaft or part rotating as a vehicle moves. Brake shoes 28 are pivotally connected to levers 30 by links 32 so that they may be moved into and out of frictional engagement with the brake drum 24 in guides 33 with movement of each lever 30 about a pivot pin 34. The pivot pins 34 support the levers 30 from an end portion of the driving motor 26. Windings 36 are disposed on the links 32 in a manner such that when the windings are energized a magnetic flux will be produced having a path including the brake drum 24, the brake shoes 28, the links 32, the levers 30, the pivot pins 34, and the end portion of the motor 26, all of which are of magnetic material, such as iron or steel. This magnetic flux will cause the brake shoes 28 to be attracted to the rotor 24 as well as causing eddy currents to be generated in the rotor, if rotating, thereby producing both a friction and an eddy current braking effect.

The levers 30 also have connected therewith a brake cylinder 38 and a piston rod 40, associated with a piston 42 in the brake cylinder, as shown, so that when fluid under pressure is supplied to the brake cylinder the brake shoes 28 are moved into frictional engagement with the brake drum 24. The brake shoes 28 are held in release position by action of spring 44 on the lowermost ends of the levers 30.

The foot pedal device 12 is provided with a foot pedal 46 pivotally supported at 48 from a convenient surface 50 and having an arm 52 rigid therewith. The arm 52 is pivotally connected to a bell crank lever 54, associated with the rheostat device 14, through a link 55, so that depressing the foot pedal 46 causes the bell crank lever 54 to operate the rheostat device 14 in a manner and for a purpose hereinafter more fully described. A contact 56 is insulated from and carried by an arm 58 pivotally connected with the arm 52 by a link 60. The arm 58 is pivotally supported by a bracket 62 in a manner such that when the foot pedal 46 is held in its uppermost or release position by spring 51 the movable contact 56 engages a stationary contact 64 to energize a winding 66 of the valve device 20 from a source of current supply, such as a battery 68, and when the foot pedal 46 is depressed the movable contact 56 moves out of engagement with the contact 64 and engages another stationary contact 70, remaining in engagement therewith for all depressed positions of the foot pedal, to energize the circuit breaker winding 72 from the battery 68. The object of this action of contact 56 will appear later.

The magnetically operated valve device 20 comprises two similar valve sections 74 and 76, assembled together for convenience, the valves of each section being independently controlled with respect to the other. The valve section 74 comprises a valve chamber 73 having constant communication with the brake cylinder 38 by pipe 77; a supply valve 78 secured to a valve stem 75 and cooperating with a valve seat 79 to control the supply of fluid under pressure from supply chamber 80 to the valve chamber 73 and hence to the brake cylinder 38; a release valve 82, also secured to the valve stem 75, and cooperating with a valve seat 83 to vent the brake cylinder 38 to the atmosphere through chamber 84 and port 85 when the supply valve 78 is in seated position; a spring 86 urging the stem 75 upwardly to unseat the supply valve 78 and seat the release valve 82; and an electromagnet having a winding 88 adapted when energized to attract an armature 89, secured to the end of the valve stem 75, to seat the supply valve 78 and unseat the release valve 82, against resistance of the spring 86 and fluid pressure on the underside of the valve 78.

The valve section 76 comprises a valve chamber 90 having constant communication with the previously described supply chamber 80 by passage 92; a supply valve 94 secured to a valve stem 96 and cooperating with a valve seat 95 to control the supply of fluid under pressure from a supply chamber 98 having constant communication with a source of fluid under pressure, as a reservoir 99, to the valve chamber 90, and hence to the valve section 74; a release valve 100, also secured to the valve stem 96, and cooperating with a valve seat 101 to vent the valve chamber 90 to the atmosphere through chamber 102 and port 104 when the supply valve 94 is in seated position; a spring 106 urging the valve stem 96 upwardly to seat the release valve 100 and unseat the supply valve 94; and a slow release electromagnet having the aforementioned winding 66 adapted when energized to attract an armature 108, secured to the end of the valve stem 96, to seat the supply valve 94 and unseat the release valve 100, as shown, against resistance of the spring 106 and fluid pressure on the underside of the valve 94, the slow release feature being accomplished in any of a number of well known ways, as for example by placing a short circuited turn in the form of a washer 110 of copper, brass, or the like, between the armature 108 and the adjacent end of the winding 66.

For controlling the degree of braking effect produced by the brake device 10 in accordance with the degree the foot pedal 46 is depressed, the windings 36 of the brake device are connected to a source of power supply in series with the rheostat device 14 through a trolley 112, circuit breaker contacts 114, a resistance device 116, and a ground connection 118, which may be a track, third rail, or the like. The rheostat device 14 may be of any type adapted to vary the current to the windings 36 in accordance with movement of the foot pedal 46, and we have accordingly diagrammatically indicated one well known type at 14 commonly referred to as a "carbon pile rheostat". The carbon discs of this device 14 are adapted to be compressed by the bell crank lever 54 as the foot pedal 46 is depressed and to be released as the foot pedal returns toward release position, thus varying the current according to the pressure exerted on the carbon discs, which is in accordance with the movement of the foot pedal 46. The windings 36 may be connected in series, as shown, or in any other manner producing a like effect.

For preventing the brake device 10 from being operated by fluid under pressure while it is being operated by electric current supplied thereto and while the vehicle being braked is still in motion, we have provided the interrupter device 16 inductively connected to the winding 88 of the valve device 20 through a transformer 17 and the rectifier device 18, as shown. The interrupter device comprises a rotatable member 120 of insulating material having uniformly spaced peripheral contacts 122 thereon adapted to intermittently engage brushes 124 to periodically interrupt current supplied to the primary winding 126 of the transformer 17, so that a current may be established in the transformer secondary winding 132 of an alternating character corresponding to the interruptions in the primary circuit. Current may be supplied to the primary circuit from the trolley 112 and ground connection 118 through a current limiting resistance 128. The rotatable member 120 is rigidly secured to the motor shaft 27, or to any other part which will cause the rotatable member to be rotated in accordance with the speed of the vehicle with which the apparatus is associated. Thus the variations in the secondary current will correspond with the speed of the vehicle.

The rectifier device 18 comprises four valvular units 130, each of which will conduct current only in the direction indicated by the arrowheads. The units are arranged in the series relation shown.

They may be of any of the well known types, such for example as the copper oxide type rectifier unit. The secondary winding 132 and the winding 88 of the valve device 20 are connected to the rectifier device as shown, and it will thus be obvious that the alternating current induced in the secondary winding 132 will be rectified by the rectifier device 18 and be delivered to the winding 88, through contacts 134 when closed, as a unidirectional or direct current, producing a uniform pull on the armature 89 to operate the valves 78 and 82 as before described. The contacts 134 form part of a "current on" relay having a winding 136 connected across the resistance device 116 and which is adapted to be energized to close the contacts 134 when current is being supplied to the brake windings 36 through the resistance device 116.

For preventing the brake device 10 from being operated by electric current while being operated by fluid under pressure, we have provided the pneumatically operated circuit breaker 22, comprising a casing 138 containing a flexible diaphragm 140 defining chambers 142 and 143, the chamber 143 having connection with the pipe 77, so that when fluid under pressure is supplied to the brake cylinder 38 it also flows into the chamber 143 and operates the diaphragm 140 to open otherwise closed contacts 144 in series with the circuit breaker winding 72.

A brake device 10 may be associated with each driving motor of a vehicle, as may be inferred from Fig. 3. As there shown driving motors 146 and 148 are supported from a truck frame 150 and are in driving relation with the vehicle axles 152 and 154, respectively. A brake device 10 is associated with the motor 146 in the manner already described, and if desired a similar brake device may be associated with the shaft 156 of the motor 148.

In operation, when the foot pedal 46 is in its uppermost or release position, as shown in Fig. 1, circuit breaker winding 72 will be deenergized, winding 66 of valve device 20 will be energized to seat supply valve 94, and winding 88 of valve device 20 will be deenergized permitting valve 78 to be unseated, thereby venting brake cylinder 38 to the atmosphere. Since under these conditions neither current nor fluid under pressure is supplied to the brake device 10, the brake shoes 28 are held in release position by spring 44.

When it is desired to produce a braking effect on a moving vehicle equipped with the apparatus heretofore described, the foot pedal 46 is depressed to a degree according to the degree of braking effect desired. Winding 66 is then deenergized, due to separation of contacts 56 and 64, but because of the slow release characteristic of the electromagnet, circuit breaker winding 72 is energized, by engagement of contacts 56 and 70, to close contacts 114 and permit current to be supplied to the brake windings 36 to produce a combined friction and eddy current braking effect, as heretofore described, before supply valve 94 is unseated. Current flows to the brake windings 36 through the rheostat device 14, which is controlled by the foot pedal 46, and through the resistance device 116. Current in the resistance device 116 causes the relay winding 136 to be energized thereby closing contacts 134. It will be apparent that a pulsating current is supplied to the primary winding 126 of the transformer 17 so long as the vehicle is in motion, by virtue of which the winding 88 of the valve device 20 is energized on closing of contacts 134 to seat valve 78 and unseat valve 82, as heretofore described. It is to be understood that the slow release characteristic of the electromagnet having winding 66 is such that when the vehicle is in motion winding 88 is energized to seat valve 78 and unseat valve 82 before valve 94 is unseated, thus preventing fluid under pressure from being supplied to the brake cylinder 38 so long as winding 88 is energized.

The design of the electromagnet having winding 88 is such that just before the vehicle is brought to a stop through action of the combined friction and eddy current braking effect, the pull on the armature 89, due to the current in winding 88, is overcome by the combined force exerted by the spring 86 and fluid pressure on the underside of the valve 78, thereby unseating valve 78 and seating valve 82. Fluid under pressure will therefore flow from the reservoir 99 past the unseated valve 94, through the passageway 92, past the now unseated valve 78 to pipe 77, from whence it flows to both the pneumatically operated circuit breaker 22 and the brake cylinder 38. The circuit breaker 22 opens contacts 144 in the manner already described, whereupon the supply of current to the circuit breaker winding 72 from battery 68 is interrupted and contacts 114 are opened to deenergize the brake windings 36. Simultaneously with this action, fluid under pressure supplied to the brake cylinder 38 causes the brake shoes to be held in frictional engagement with the brake drum 24 in accordance with the degree of fluid pressure supplied. The vehicle therefore comes to a stop with the brake device 10 being operated by fluid under pressure to hold the vehicle at rest.

When the vehicle is being held at rest by operation of the brake device 10 by fluid under pressure, the foot pedal 46 must be held in a depressed position, because if allowed to return to release position winding 66 will be energized to seat valve 94 and unseat valve 100, thereby cutting off the supply of fluid under pressure to, and venting, the brake cylinder 38.

If when braking the vehicle by supplying current to the brake windings 36, the supply of electric power should be interrupted, as by a trolley coming off, failure of power, or for other reasons, relay winding 136 will be immediately deenergized, opening contacts 134 and deenergizing winding 88, thereby permitting fluid under pressure to be supplied to the brake cylinder 38 so long as the foot pedal 46 is depressed. Thus upon a failure of the current supply fluid under pressure is immediately supplied to operate the brake device 10. In a similar manner, if the supply of fluid under pressure should fail for any reason, and electric power is still available, the vehicle would be both brought to a stop and held at rest by the supply of electric current to the brake device 10, as the pneumatically operated circuit breaker 22 would not then open contacts 144 and circuit breaker winding 72 would remain energized.

From the foregoing description it will be apparent that we have produced a brake apparatus operable by a single control element to produce a combined eddy current and friction brake effect on a vehicle by electric means while the vehicle is in motion, and a friction brake effect by fluid pressure means while the vehicle is at rest, with provision for preventing the fluid pressure means from operating while the electric means is operating, but providing for automatic operation of the other upon failure of the one.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. In a vehicle brake apparatus, the combination with a rotatable brake member and a brake shoe, of means associated with said shoe for simultaneously producing frictional engagement by magnetic attraction between said shoe and member and an eddy current braking effect on said member, manually operated means for controlling said last means, and means operable automatically and independently of said manually operated means when said eddy current braking effect becomes relatively ineffective for producing said frictional engagement by action of fluid under pressure.

2. In a vehicle brake apparatus, the combination with a rotatable brake member and a brake shoe, of means associated with said shoe for simultaneously producing frictional engagement by magnetic attraction between said shoe and member and an eddy current braking effect on said member, manually operated means for controlling said last means, and means operable automatically and independently of said manually operated means for subsequently rendering said magnetic attraction and eddy current braking effect ineffective and for maintaining said frictional engagement effective by action of fluid under pressure.

3. In a vehicle brake apparatus, the combination of a brake device operable by electric means to produce a combined friction and eddy current braking effect and by fluid pressure means to produce a friction brake effect only, a movable control element, means governed by movement of said element for controlling producing of said combined effect by said electric means, and means operable independently of movement of said element for cutting said electric means out of action and cutting said fluid pressure means into action.

4. In a vehicle brake apparatus, the combination of a brake device operable by electric means to produce a combined friction and eddy current braking effect and by fluid pressure means to produce a friction brake effect only, a movable control element, means governed by movement of said element for controlling producing of said combined effect by said electric means, and means governed by a predetermined reduction in said eddy current braking effect for cutting said electric means out of action and cutting said fluid pressure means into action independently of movement of said element.

5. In a vehicle brake apparatus, the combination of a brake device operable by electric means to produce a combined friction and eddy current braking effect and by fluid pressure means to produce a constant friction brake effect only, a movable control element, means for controlling the producing of said combined effect by said electric means in accordance with movement of said element, and means operable independently of said control element for automatically cutting said electric means out of action and cutting said fluid pressure means into action when said eddy current brake effect diminishes substantially to zero.

6. In a brake apparatus, the combination with a brake device adapted to produce an eddy current braking action, of means for producing an electrical effect independently of and in accordance with the effectiveness of said eddy current braking action, and means rendered operable when said electrical effect diminishes below a predetermined value for rendering said brake device ineffective to produce an eddy current braking action.

7. In a vehicle brake apparatus, the combination of a brake device adapted to be associated with a vehicle and operable by electric means to produce a combined friction and eddy current braking effect and by fluid pressure means to produce a friction brake effect only, means for operating said device by said electric means and preventing operation by said fluid pressure means when said vehicle is in motion, and means operable when said vehicle stops for cutting said electric means out of action and for cutting said fluid pressure means into action.

8. In a vehicle brake apparatus, the combination of a brake device adapted to be associated with a vehicle and operable by electric means to produce a combined friction and eddy current braking effect and by fluid pressure means to produce a friction brake effect only, an auxiliary control circuit adapted to be connected to a source of power supply, means governed by motion of said vehicle for periodically interrupting current flow to said circuit, and electro-responsive means operable by said current interruptions for controlling an operation of said brake device.

9. In a vehicle brake apparatus, the combination of a brake device adapted to be associated with a vehicle and operable by electric means to produce a combined friction and eddy current braking effect and by fluid pressure means to produce a friction brake effect only, an auxiliary control circuit adapted to be connected to a soure of power supply, means governed by motion of said vehicle for periodically interrupting current flow to said circuit, and electro-responsive means operable by said current interruptions for preventing operation of said brake device by said fluid pressure means when operated by said electric means.

10. In a fluid pressure brake system, the combination with a brake cylinder, of a magnet valve device operable to effect a supply of fluid under pressure to said brake cylinder, a circuit connecting said magnet valve device to a source of current supply, a switch device adapted to open and close said circuit to deenergize or energize said magnet valve device, and means for delaying the operation of said magnet valve device when deenerized or energized.

11. In a vehicle brake system, the combination with a brake device operable by electric means and by fluid pressure means, of a circuit for connecting said electric means to a source of current supply, a resistance device in said circuit, means for controlling the supply of fluid under pressure to said fluid pressure means, and means responsive to the voltage across said resistance device for controlling said last means.

12. In a vehicle brake system, the combination with a brake cylinder, of a magnet valve device operable to cut off the supply of fluid under pressure to said brake cylinder, means for producing a pulsating voltage in accordance with the speed of the vehicle, means for rectifying said voltage, a circuit connecting said last means with said magnet valve device, and a relay controlling opening and closing of said circuit.

13. In a vehicle brake system, the combination with a brake device operable by electric means and by fluid pressure means, of an electroresponsive valve means operable to control the supply of fluid under pressure to operate said fluid pressure means, means for producing a pulsating voltage in accordance with the speed of the vehicle, means including a circuit responsive to said pulsating voltage for effecting energization of said electroresponsive valve means, means for supplying current to operate said electric means, and means responsive to current supplied to said electric means for controlling opening and closing of said circuit.

14. In a vehicle brake apparatus, the combination with a brake device operable by electric means and by fluid pressure means, of means for supplying current to said electric means, means for supplying fluid under pressure to said fluid pressure means, means responsive to the supply of current to said electric means for controlling the supply of fluid under pressure to said fluid pressure means, and means responsive to the supply of fluid under pressure to said fluid pressure means for controlling the supply of current to said electric means.

15. In a vehicle brake system, in combination, an electric brake device, a circuit for supplying current to said brake device, a circuit breaker for opening and closing said circuit, contacts adapted to be manually operated to effect operation of said circuit breaker to close said circuit, a brake cylinder, means for supplying fluid under pressure to said brake cylinder, and a pneumatic relay operable by brake cylinder pressure to effect operation of said circuit breaker to open said circuit.

16. In a vehicle brake system, the combination with a brake device operable by electric means and by fluid pressure means, of a circuit for supplying current to said electric means, a circuit breaker operable when energized to close said circuit, a magnet valve device operable to effect a supply of fluid under pressure to said fluid pressure means, a circuit connecting said magnet valve device to a source of current supply to energize said magnet valve device, contacts operable to deenergize said magnet valve device and to effect energization of said circuit breaker, means for delaying operation of said magnet valve device when deenergized until current has been supplied to said electric means, and means for preventing the supply of fluid under pressure to said fluid pressure means when said electric means is effective.

17. In a vehicle brake system, the combination with a brake device having an exciting winding and a brake cylinder, of a circuit for supplying current to said winding, a circuit breaker for controlling opening and closing of said circuit, a resistance device in said circuit, a transformer device connected to a source of current supply, an interrupter device for interrupting the supply of current to said transformer device, a rectifier device connected to said transformer device and adapted to rectify the output of said transformer, a magnet valve device operable to control the supply of fluid under pressure to said brake cylinder, a circuit connecting said rectifier device to said magnet valve device, an electric relay connected across said resistance device for controlling opening and closing of said last circuit, and a pneumatic relay operated by fluid under pressure supplied by said magnet valve device for effecting an operation of said circuit breaker.

18. In a vehicle brake system, the combination with a brake device having an exciting winding and a brake cylinder, of an auxiliary circuit, an interrupter device in said circuit, a second circuit inductively related to said auxiliary circuit, a magnet valve device in said second circuit operable to control the supply of fluid under pressure to said brake cylinder, a power circuit for supplying current to said winding, and a relay responsive to current in said power circuit for controlling opening and closing of said second circuit.

19. In a vehicle brake system, the combination with a brake device having an exciting winding and a brake cylinder, of an auxiliary circuit, an interrupter device operated according to the speed of the vehicle and connected in said auxiliary circuit, a second circuit inductively related to said auxiliary circuit, a magnet valve device operable to control the supply of fluid under pressure to said brake cylinder and connected in said second circuit, a power circuit adapted to supply current to said exciting winding, a relay responsive to current in said power circuit for controlling opening and closing of said second circuit, a circuit breaker for controlling said power circuit, and a switch device responsive to the supply of fluid under pressure to said brake cylinder for controlling energization of said circuit breaker.

20. In a vehicle brake system, in combination, brake means, current responsive means for controlling said brake means, a transformer device having a primary winding and a secondary winding, a first circuit for connecting said secondary winding to said current responsive means, a source of direct current supply, a second circuit for supplying current to said primary winding, and contact means for intermittently connecting said second circuit to said source of supply.

21. In combination, vehicle control means, electroresponsive means for controlling said control means, a transformer device having a primary winding and a secondary winding, a first circuit for connecting said secondary winding to said electroresponsive means, a rectifier device in said circuit for rectifying the current supplied from said secondary winding, a source of direct current supply, a second circuit for supplying current to said primary winding, and a rotary contact device for intermittently connecting said second circuit to said source of supply.

JOHN W. LOGAN, Jr.
GEORGE W. BAUGHMAN.